(12) United States Patent
Wilde et al.

(10) Patent No.: US 8,498,302 B2
(45) Date of Patent: Jul. 30, 2013

(54) SYSTEM AND METHOD FOR EXPOSING THIRD PARTY CALL FUNCTIONS OF THE INTELLIGENT NETWORK APPLICATION PART (INAP) AS A WEB SERVICE INTERFACE

(75) Inventors: Andreas Wilde, Karlstad (SE); Elaine Peng, San Francisco, CA (US); Boris Selitser, Castro Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 943 days.

(21) Appl. No.: 12/493,735

(22) Filed: Jun. 29, 2009

(65) Prior Publication Data

US 2010/0329238 A1 Dec. 30, 2010

(51) Int. Cl.
*H04L 12/28* (2006.01)

(52) U.S. Cl.
USPC ........................................................ 370/401

(58) Field of Classification Search
None
See application file for complete search history.

(56) References Cited

U.S. PATENT DOCUMENTS

| | | | |
|---|---|---|---|
| 6,504,852 B1* | 1/2003 | Couturier et al. | 370/467 |
| 6,600,751 B1* | 7/2003 | Couturier | 370/401 |
| 8,001,246 B2* | 8/2011 | Lu et al. | 709/226 |
| 8,160,572 B2* | 4/2012 | Bovet | 455/424 |
| 8,218,528 B2* | 7/2012 | Cai | 370/352 |
| 2003/0058884 A1* | 3/2003 | Kallner et al. | 370/465 |
| 2004/0098497 A1* | 5/2004 | Banet et al. | 709/230 |
| 2005/0105706 A1* | 5/2005 | Kokkinen | 379/201.01 |
| 2006/0136251 A1* | 6/2006 | Sung et al. | 705/1 |
| 2008/0294712 A1* | 11/2008 | Lu et al. | 709/202 |
| 2009/0325636 A1* | 12/2009 | Jesse et al. | 455/554.1 |
| 2010/0197296 A1* | 8/2010 | Bovet | 455/424 |

* cited by examiner

*Primary Examiner* — Otis L Thompson, Jr.
(74) *Attorney, Agent, or Firm* — Fliesler Meyer LLP (57) ABSTRACT

Systems and methods are described for exposing the third party call control functionality of a telecom signaling network as a web services interface. An intelligent network application part (INAP) plug-in is used to provide the translation logic of simple web service interface calls received from a client application, into the lower-level signaling protocol invocations needed to provide the third party call functionality at the network level. The INAP plug-in is deployed in a service access gateway positioned between the telecommunications signaling-based network and a multitude of service provider applications that seek to access various functions in the network. By implementing the INAP plug-in, applications are provided with access to third party call control (3PCC) within the network, without the necessity of invoking low-level signaling needed to establish calls, terminate or cancel calls, as well as obtain various call information.

20 Claims, 5 Drawing Sheets

SYSTEM AND METHOD FOR EXPOSING THIRD PARTY CALL FUNCTIONS OF THE INTELLIGENT NETWORK APPLICATION PART (INAP) AS A WEB SERVICE INTERFACE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to telecommunication network functionality and more specifically to exposing third party call control signaling functionality as a web service interface.

BACKGROUND

Given the recent dramatic growth in wireless and cellular communications, more and more businesses and other entities are integrating themselves with mobile device technologies. In addition to standard voice features, modern cellular phones and similar devices provide countless other services, such as internet access, email, short messaging service (SMS) texting, digital cameras, multimedia messaging service (MMS), Bluetooth, gaming, various web-based applications and the like. As a result, telecommunication carriers and network operators have been under increased pressure to provide more and more service offerings to their subscribers. Today's network operator wants to attract new and retain customers, develop profitable new business models, improve returns and launch new services as quickly as possible. In addition, the possible competitive pressures from other entities such as internet-based providers have been a growing area of concern in this field.

Faced with these challenges, most operators expect a drastic increase in their portfolio of content and application offerings, from a handful now, to thousands and possibly even millions in the future. While some of these offerings will be developed and deployed in house, the vast majority of these new applications will likely be sourced from partners, Web applications such as social networking sites and third party service providers. These outsourced services will be deployed and executed outside of the carrier's internal network, thereby creating new challenges in security, integration and management of the environment.

To assist with these challenges, new telecommunication gateways and software applications have emerged, which are typically deployed by the network operator as part of a service development platform (SDP). These gateways usually provide features for managing the ecosystem between the operator, its internal subscriber network and various third party providers. For example, a communication services gateway may help to secure third party access to the operator's core network, provide service level agreement (SLA) enforcement, as well as perform numerous other functions.

These service access gateways have greatly simplified the management and control of accessing the telecom network by various third party service providers. However, there still exists significant room for improvement in the ease of use and access of proprietary telecom networks, as well as providing new features and functionality for users. For example, certain legacy networks are frequently accessed by specific and low level signaling protocols. One such set of protocols is the signaling system 7 (SS7) protocol suite and in particular the intelligent network application part (INAP) used in intelligent network architecture. In order to gain access to functionality in these types of legacy networks, the application developer is generally forced to learn the particular signaling protocol, or to use some other mechanism to overcome the disconnect that exists between web development and low level network signaling protocols. What is needed is a simpler and more direct approach to integrating the network operator functionality with services and features in the web application world.

SUMMARY OF INVENTION

In the present disclosure, systems and methods are described for exposing the third party call control functionality of a telecom signaling network as a web services interface. An intelligent network application part (INAP) plug-in is used to provide the translation logic of simple web service interface calls received from a client application, into the lower-level signaling protocol invocations needed to provide the third party call functionality at the network level. The INAP plug-in is deployed in a service access gateway positioned between the telecommunications signaling-based network and a multitude of service provider applications that seek to access various functions in the network. By implementing the INAP plug-in, applications are provided with access to third party call control (3PCC) within the network, without the necessity of invoking low-level signaling needed to establish calls, terminate or cancel calls, as well as obtain various call information.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

In accordance with the embodiments of the invention, systems and methods are described for exposing third party call functionality of legacy telecommunication networks to a service provider application. In particular, third party call control of a signaling system 7 (SS7) protocol stack is exposed as a web services interface by using an intelligent network application part (INAP) plug-in. The INAP plug-in can be deployed in a gateway that is positioned between the service provider application and the telecom network. The plug-in provides protocol mapping between a northbound application-facing web services interface (e.g. ParlayX Third Party Call) and the southbound network-facing interface (INAP). By employing the INAP plug-in, the developers of the service provider web application are allowed access to third party call control functions without having to know the low level signaling protocols used to access such functions. As such, the plug-in provides a layer of abstraction to web developers and applications seeking to integrate with the legacy telephony networks, and enables new features and functionality to be easily incorporated therewith.

In one embodiment, the plug-in is deployed in a service access gateway (SAG) positioned between the telecommunications network and the various external applications (e.g. web applications) seeking to access the functionality of the network. It should be noted that, as used throughout this disclosure, the terms gateway, service access gateway, and telecommunications gateway, all refer to the same thing. The gateway can serve as a security gatekeeper to the network, providing service level agreement (SLA) enforcement, traffic management and protocol translation features. In one embodiment, the gateway is a set of software applications that perform some services to the requests flowing to/from the network. In alternative embodiments, the gateway can be implemented as hardware, firmware, or any combination thereof.

The INAP plug-in is deployed in the gateway as part of a set of service exposure services. In one embodiment, the plug-in works with TietoEnator's SS7 stack through a Java INAP application programming interface (API). INAP is a signaling protocol used in intelligent network architecture and it is a part of the SS7 protocol suite. The INAP plug-in provides access to third party call control (3PCC) features of the SS7 suite. 3PCC allows one entity (controller) to set up and manage communications (telephone call) between two or more other parties. For example, a web application (third party) can set up a telephone call between two or more subscribers. Normally, a sequence of signaling calls need to be performed by the application in order to access this function, however the INAP plug-in allows the application to make a simple web services invocation, such as "makeCall" to the gateway and the plug-in can take care of the low level signaling protocols necessary to establish the call. More specifically, the plug-in can employ the INAP Java API provided by the SS7 stack in order to set up the INAP dialogue for making the call.

Figure 1:
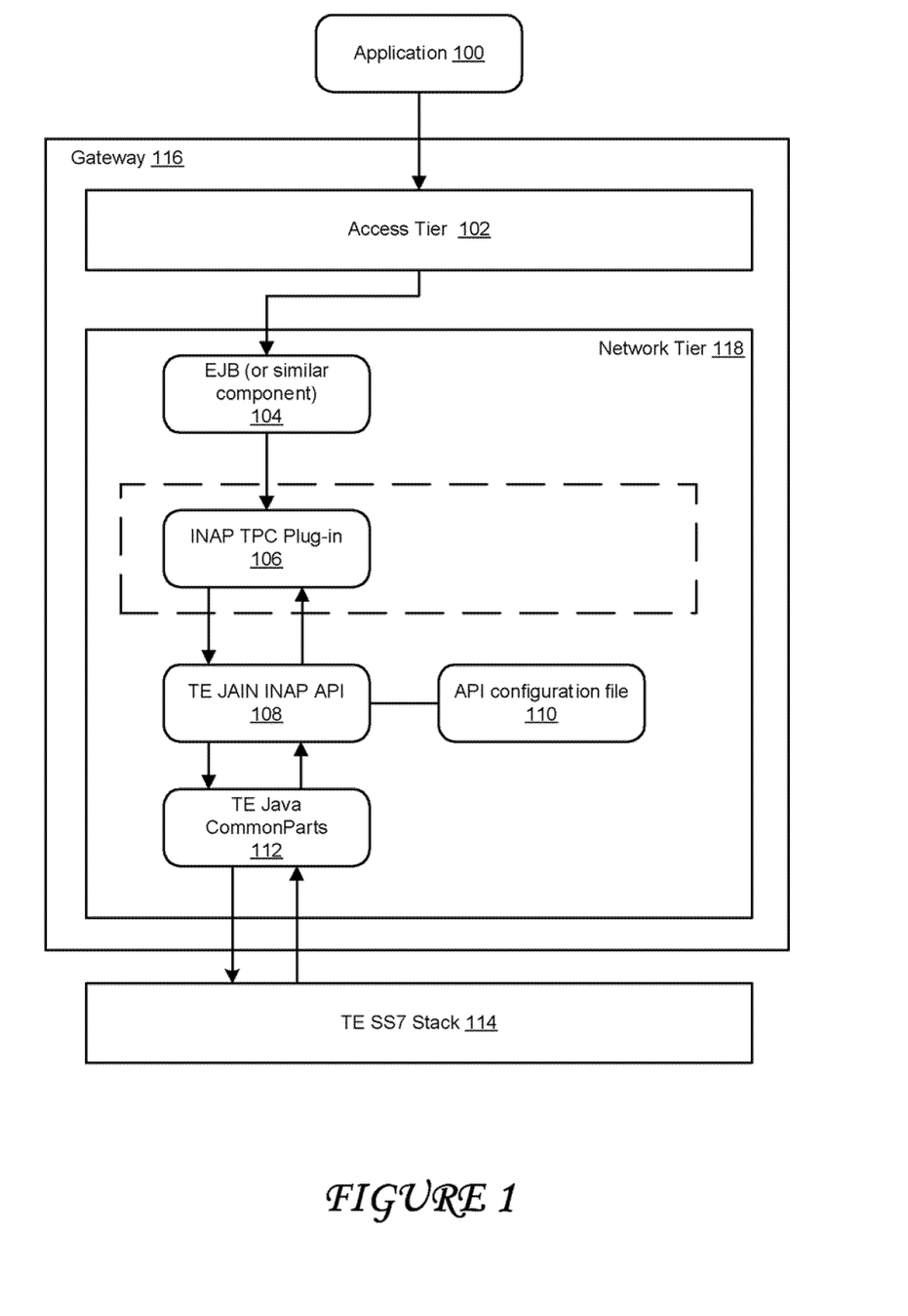
FIG. 1 is an illustration of the INAP third party call plug-in, in accordance with various embodiments of the invention.

FIG. 1 is an illustration of the INAP third party call plug-in, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the INAP plug-in 106 is deployed in a service access gateway 116 that manages communication access between applications 100 and the SS7 stack 114. The plug-in interacts with the SS7 stack via the JAIN (Java APIs for Integrated Networks) INAP API 108 which in turn uses the Java CommonParts API 112. The INAP API library reads properties from a configuration file 110, which is pointed out by the INAP plug-in 106. As requests from the application 100 are received, they can be translated into a set of INAP calls by the plug-in 106 in order to invoke third party call control functionality within the SS7 stack. It should be noted that the SS7 stack, as illustrated in FIGS. 1-3, is part of a product produced by Ericsson™ and is separate with respect to the service access gateway.

In one embodiment, all direct interaction with the INAP API is isolated in one single entity in the plug-in 106, the call handler. The call handler can send and receive INAP operations in transactions, where a transaction can contain one or more INAP operations. The transactions associated with a particular call are sent over one INAP dialogue. In one embodiment, interaction with the Java INAP API is asynchronous—outbound transactions (request transactions) are sent via INAPPRovider.send and inbound transactions (indication transactions) are received via callbacks to an INAPListener interface, registered with an INAPProvider reference is requested by the INAP plug-in 106.

In various embodiments, the gateway can further include an access tier 102 and a network tier 118. The stateless access tier 102 can serve as an entry point for external (possibly un-trusted) third party applications into the network. The network tier 118 which integrates with the internal network can be shielded from the applications by the access tier. The network tier can receive requests from the access tier via an EJB or another similar component 104. In one embodiment, all plug-ins of the gateway, including the INAP plug-in 106 can be deployed in the network tier 118.

Figure 2:
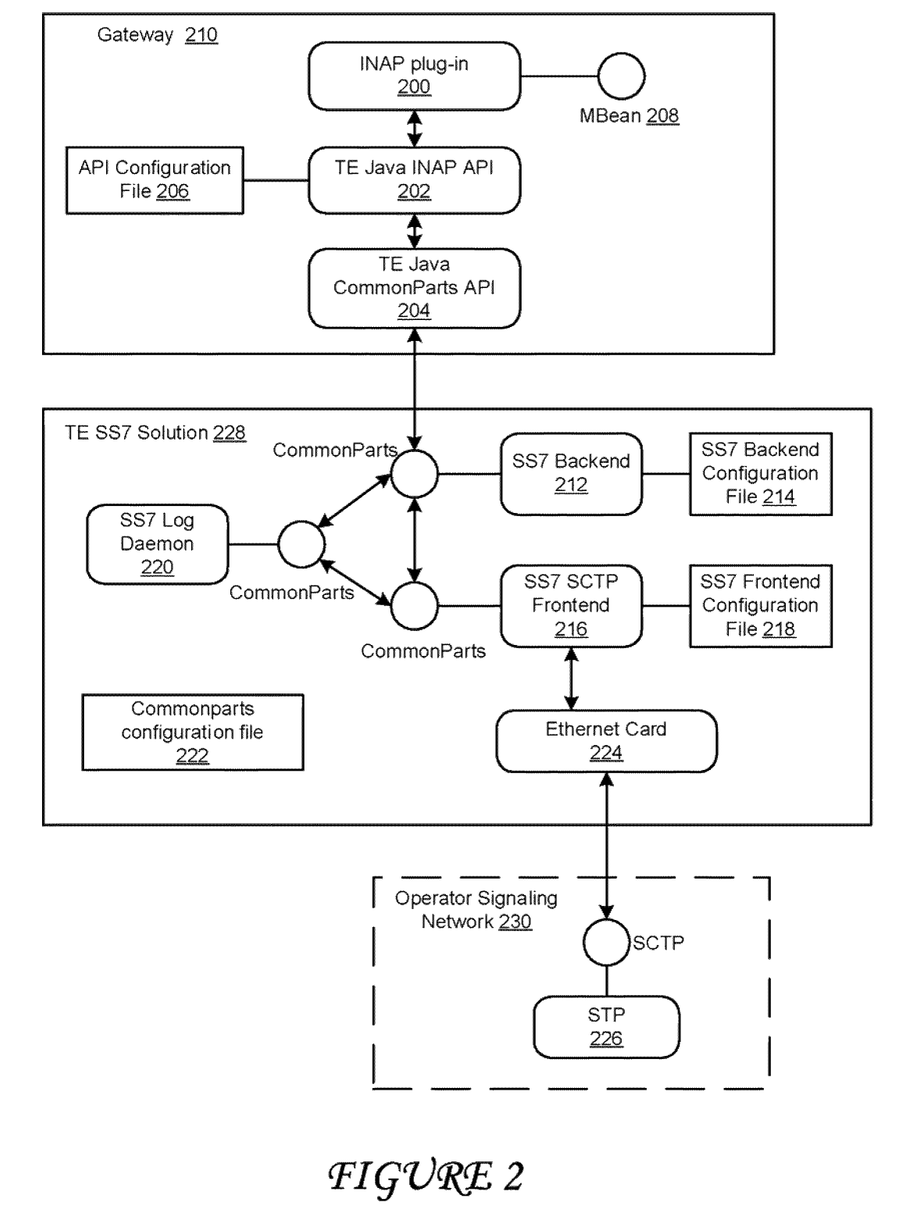
FIG. 2 is an illustration of the gateway and the INAP plug-in working in conjunction with the SS7 stack in standalone mode, in accordance with various embodiments of the invention.
Figure 3:
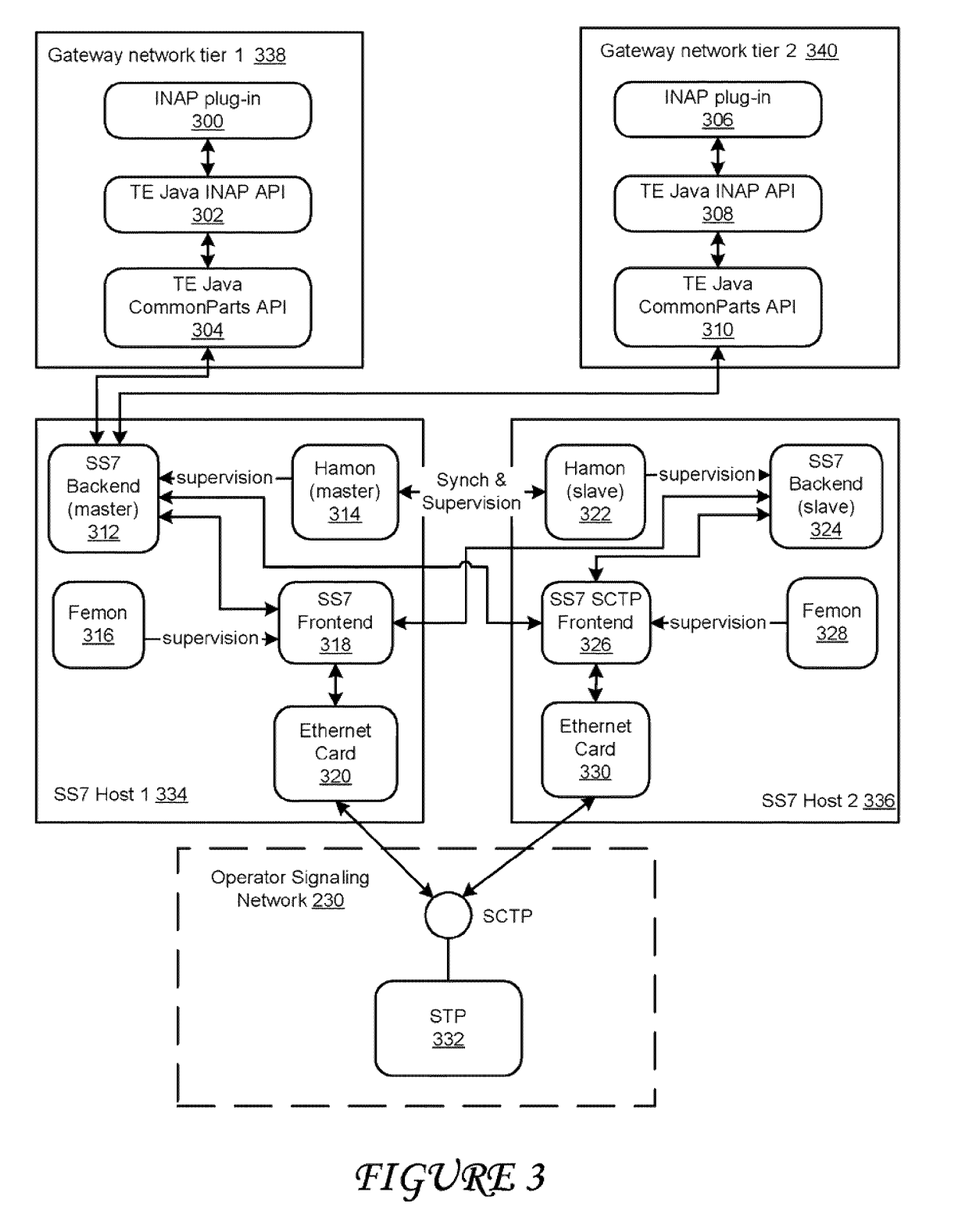
FIG. 3 is an illustration of the gateway and the INAP plug-in working in conjunction with the SS7 stack in high availability mode, in accordance with various embodiments of the invention.

FIG. 2 is an illustration of the gateway and the INAP plug-in working in conjunction with the SS7 stack in standalone mode, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As previously described, the gateway 210 can include the INAP plug-in 200 which can use the Java INAP API 202 that communicates with the SS7 stack via the Java CommonParts API 204. The INAP plug-in can also provide a Java Management Extension (JMX) MBean interface 208 for provisioning.

As further illustrated, the signaling software 228 can be comprised of three processes, the SS7 backend 212 which contains the SS7 stack down to the transport level; the SS7 frontend 216 which employs the stream control transmission protocol (SCTP) using Ethernet network interface cards (NIC) 224 in the host; and a Log Daemon 220 which logs on behalf of both backend and frontend processes. In one embodiment, all of the SS7 processes communicate internally via a TCP/IP based protocol called CommonParts. This CommonParts protocol is also used for communications between the gateway 210 and the signaling stack 228. CommonParts transfers messages between users where each user is identified by a CommonParts module identifier (ID). A module ID is either associated with its own port number or with another user ID that owns its own port.

In addition to the MBean 208, configuration information can also be provided in four additional places. In one embodiment, the INAP API configuration file 206 provides the API with the details about where to connect, how to bind to the stack and values for a subset of parameters that are not exposed in the API. This file can be generated by the plug-in at startup time based on configuration data provided through the MBean interface 208.

In addition, the CommonParts configuration file 222 can configure the interprocess communication for the stack. In one embodiment, all stack processes read this file at startup. The SS7 backend configuration file 214 contains configuration of the SS7 backend stack layers. Each layer has a dedicated section in this file, where information such as SS7 network routing and protocol timers is configured. The SS7 frontend configuration file 218 contains specific configuration details for the front end process (SCTP).

In various embodiments, the SS7 front end further connects to a signal transfer point (STP) 226 in the operator's signaling network 230 by an Ethernet card 224 and over the SCTP protocol.

FIG. 3 is an illustration of the gateway and the INAP plug-in working in conjunction with the SS7 stack in high availability mode, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As shown, the SS7 stack can also be deployed in a high availability (HA) configuration. In this mode, two SS7 backends 312, 324 work together in an active-standby configuration. The frontend processes 318, 326 are shared between the two backends. In one embodiment, the active backend 312 handles all ongoing INAP dialogues and if that backend is lost, all ongoing dialogues are lost.

As further illustrated, the signaling solution is deployed on two servers or stack-in-a-box (SIABs) (334, 336), which can be co-located with the gateway cluster deployment. Each server runs one backend and one or more frontend processes, as well as the monitoring processes that start and supervise the frontends and backends. In one embodiment, the Femon process 316, 328 supervises the frontends on its local server and the Hamon process (314, 322) supervises the backend. In one embodiment, the Femon process always tries to keep its frontends running (always active mode) while the Hamon processes are configured with a primary role, either master 314 or slave 322. This designation can be set up in a dedicated configuration file, as previously described.

In one embodiment, the Hamon on each server in the signaling software communicates with the other—at startup these processes agree on who is master and during execution, each keeps track of the state of the remote Hamon. The slave Hamon 322 can assume the master role if it loses contact with the master Hamon 314. In addition, the slave Hamon will then activate its associated stack which is in hot standby mode (started but not active as long as it runs in slave mode).

In the gateway deployment (338, 340), the Java INAP API (302, 308) is configured with the addresses of both backend servers (e.g. in the INAP API configuration file). As previously mentioned, the Java INAP API will connect to the backend by way of the Java CommonParts API (304, 310). Since only one backend is active at a time, all INAP plug-in instances (300, 306) will use the same backend 312. If the active backend 312 is lost, all connected INAP plug-ins are notified and will need to reconnect.

Moreover, similarly to the standalone deployment, the frontend processes of both servers can communicate with the STP 332 in the operator's signaling network 230 by way of Ethernet cards (320, 330) and over the SCTP protocol.

Figure 4:
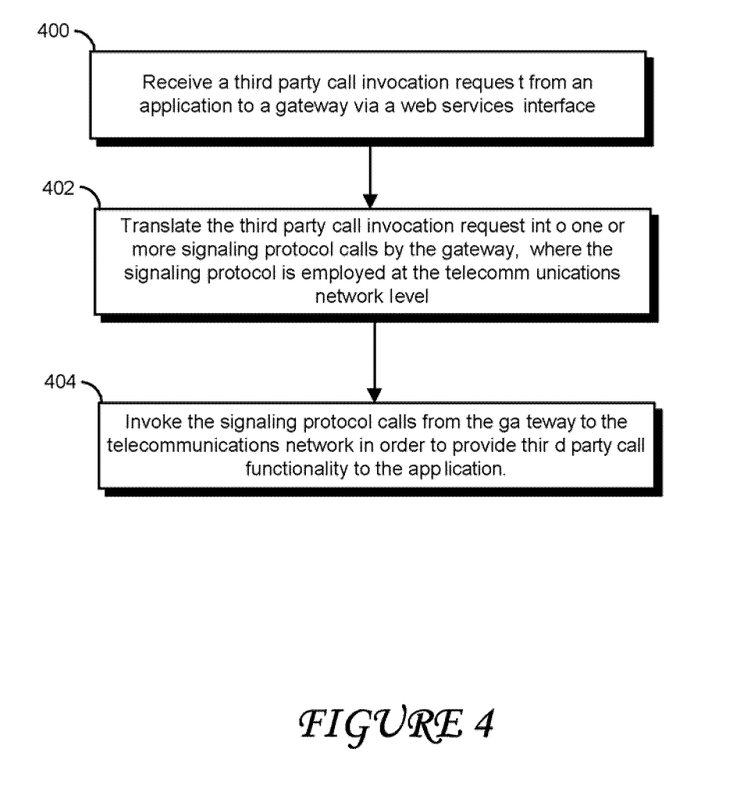
FIG. 4 is a flow diagram of a process for the interface interactions during a call, in accordance with various embodiments of the invention.

FIG. 4 is a flow chart diagram of a high level process for exposing third party call functions of INAP as a web service interface, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 400, a third party call invocation request is received from an application to a gateway via a web services interface. This call can be a simple invocation such as makeCall. As a non-limiting example, the table below illustrates a list of possible web service interface calls available to the application for accessing third party call control:

| Method | Description |
| --- | --- |
| makeCall | The invocation of this method causes INAP operations InitiateCallAttempt, RequestReportBCSMEvent, Connect and Continue to be sent. Parameters callingParty and calledParty can be used twice when establishing the connection with each call party. |
| endCall | The invocation of this operation will result in INAP operation ReleaseCall being invoked. It will also result in updates to the CallInformation store |
| cancelCallRequest | This operation would only have effect if it is invoked before the 1st participant has answered the call. If this precondition is met, the call will be released. |

-continued

| Method | Description |
|---|---|
| getCallInformation | This invocation obtains various data associated with the call from the CallInformationStore. The parameter used for this method would be the call identifier. The results can include information regarding call status, termination cause and duration. |

In step 402, the third party call invocation request is translated into one or more signaling protocol calls by the gateway, where the signaling protocol is employed at the telecommunications network level. The translation logic can be encapsulated in the INAP plug-in and can be performed by using the Java INAP API which in turns uses the CommonParts protocol, as previously described.

In step 404, the gateway can invoke a sequence of signaling protocol calls to the telecommunications network in order to provide third party call functionality to the application. As a non-limiting example, the gateway can invoke the following Java interface calls to the network:

| Method | Description |
|---|---|
| InitiateCallAttempt | The makeCall callingPartyNumber actually goes into the destinationRoutingAddress and the calledPartyNumber goes into the callingPartyNumber on the INAP side. This is because InitiateCallAttempt is used to establish a connection with the first party in the call |
| RequestReportBSCMEvent | This invocation reports events such as route failures, busy signals, answers, no answers, disconnects and the like. |
| Connect | Uses the parameters of destination routing address and calling party number to connect the call. |
| ReleaseCall | Releases a call |

The network can also transmit various requests (e.g. EventReportBCSM invocation) to the gateway in order to inform the gateway about the changes in the call state (e.g. party answered, did not answer, disconnected, etc.) or which call leg was affected by the changes in call state and the like.

Figure 5:
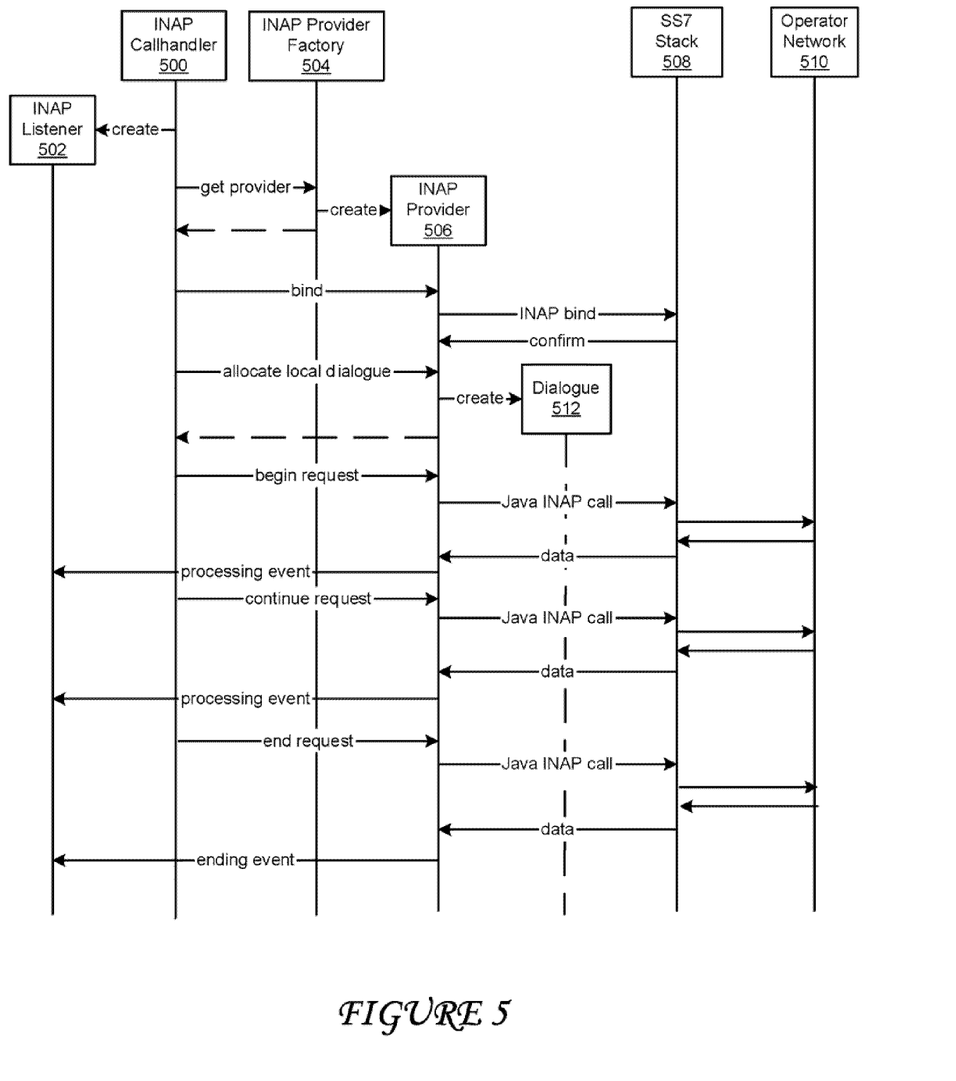
FIG. 5 is a flow diagram of a process for the interface interactions during a call, in accordance with various embodiments of the invention.

FIG. 5 is a flow diagram of a process for the interface interactions during a call, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

All direct interaction with the Java INAP API can be isolated in a single entity in the INAP plug-in—the CallHandler 500. As shown, the CallHandler uses the API provided by the INAPProviderFactory 504 in order to request an INAPProvider 506 reference with a specific configuration. The factory will create a new instance if it hasn't already been created for the particular configuration, otherwise it will return an existing provider. The plug-in will then create a new dialogue 512 via the INAPProvider and using that dialogue object, it can start sending transactions to the SS7 stack 508 and thereby to the operator's network 510. The inbound transactions are received via callbacks to the INAPListener interface 502 registered when the INAPProvider reference 506 is requested by the INAP plug-in.

In various contexts, the embodiments described throughout this disclosure encompass computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments also include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for exposing telecommunications network functionality, said system comprising:
   a telecommunications network, operating on one or more microprocessors, that provides third party call functionality via a signaling protocol, wherein the third party call functionality enables a third party to control a call between two or more other parties;
   an application that invokes said third party call functionality in response to a request from said third party;
   a gateway positioned between said application and said telecommunications network, wherein said gateway includes
      a plug-in that exposes the third party call functionality as a web service, and
      a plug-in application programming language (API) that is associated with a configuration and that enables communication between the plug-in and a signaling software component via a signaling protocol API;
   wherein the plug-in translates the web service request received from the third party, via the application, into one or more signaling protocol invocations to the telecommunications network, which are then communicated via the signaling software component to the telecommunications network, to control the call between the two or more other parties.

2. The system of claim 1, wherein the telecommunications network communicates via an intelligent network application part (INAP) of the signaling system 7 (SS7) protocol suite.

3. The system of claim 1, wherein communication between the plug-in and the telecommunications network is performed by the plug-in API asynchronously, by sending outbound transactions to a provider interface and receiving inbound transactions via callbacks to a listener interface.

4. The system of claim 1, wherein the plug-in in the gateway sends and receives INAP operations in transactions of an INAP dialogue, wherein a transaction contains one or more INAP operations.

5. The system of claim 1, wherein the configuration provides information for connection, binding to the hardware stack and values for a set of parameters which are not exposed by the interface.

6. The system of claim 1, wherein the signaling software component includes a backend process that contains the signaling protocol stack down to a transport level, a frontend process that employs stream control transmission protocol (SCTP) using Ethernet network interface cards in a host, and a log daemon process that logs on behalf of the backend process and the frontend process.

7. The system of claim 1, wherein the signaling software component is deployed on two servers, which are co-located with a gateway cluster deployment, wherein each server runs a backend and one or more frontend processes, and one or more monitoring processes that supervise the frontend and backend processes.

8. A method for exposing telecommunications network functionality, said method comprising:
   receiving a call invocation request to third party call functionality provided by a telecommunications network via a signaling protocol, from an application, via a web services interface on a gateway deployed on one more hardware processors and positioned between the application and the telecommunications network, wherein the third party call functionality enables a third party to control a call between two or more parties;
   using a plug-in in the gateway to expose the third party functionality as a web service and translate the call invocation request into one or more signaling protocol calls;
   using a plug-in application programming interface (API) to communicate the one or more signaling protocol calls to a signaling software component via a signaling protocol API, wherein the plug-in API is associated with a configuration for the communication; and
   invoking the one or more signaling protocol calls to the third party functionality via the signaling software component that communicates with the telecommunications network.

9. The method of claim 6, wherein the telecommunications network communicates via an intelligent network application part (INAP) of the signaling system 7 (SS7) protocol suite.

10. The method of claim 6, wherein the plug-in in the gateway sends and receives INAP operations in transactions of an INAP dialogue, wherein a transaction contains one or more INAP operations.

11. The method of claim 6, wherein the configuration provides information for connection, binding to the hardware stack and values for a set of parameters which are not exposed by the interface.

12. The method of claim 6, wherein communication between the plug-in and the telecommunications network is performed by the plug-in API asynchronously, by sending outbound transactions to a provider interface and receiving inbound transactions via callbacks to a listener interface.

13. The method of claim 8, wherein the signaling software component includes a backend process that contains the signaling protocol stack down to a transport level, a frontend process that employs stream control transmission protocol (SCTP) using Ethernet network interface cards in a host, and a log daemon process that logs on behalf of the backend process and the frontend process.

14. The method of claim 8, wherein the signaling software components is deployed on two servers, which are co-located with a gateway cluster deployment, wherein each server runs a backend and one or more frontend processes, and one or more monitoring processes that supervise the frontend and backend processes.

15. A non-transitory computer-readable storage medium carrying one or more sequences of instructions for exposing telecommunications network functionality, which instructions, when executed by one or more processors, cause the one or more processors to carry out the steps comprising:
   receiving a call invocation request to third party call functionality provided by a telecommunications network via a signaling protocol, from an application, via a web services interface on a gateway deployed on one more hardware processors and positioned between the application and the telecommunications network, wherein the third party call functionality enables a third party to control a call between two or more parties;
   using a plug-in in the gateway to expose the third party functionality as a web service and translate the call invocation request into one or more signaling protocol calls;
   using a plug-in application programming interface (API) to communicate the one or more signaling protocol calls to a signaling software component via a signaling protocol API, wherein the plug-in API is associated with a configuration for the communication; and invoking the one or more signaling protocol calls to the third party functionality via the signaling software component that communicates with the telecommunications network.

16. The non-transitory computer-readable storage medium of claim 15, wherein the telecommunications network communicates via an intelligent network application part (INAP) of the signaling system 7 (SS7) protocol suite.

17. The non-transitory computer-readable storage medium of claim 15, wherein the plug-in in the gateway sends and receives INAP operations in transactions of an INAP dialogue, wherein a transaction contains one or more INAP operations.

18. The non-transitory computer-readable storage medium of claim 15, wherein the configuration provides information for connection, binding to the hardware stack and values for a set of parameters which are not exposed by the interface.

19. The non-transitory computer-readable storage medium of claim 15, wherein communication between the plug-in and the telecommunications network is performed by the plug-in API asynchronously, by sending outbound transactions to a provider interface and receiving inbound transactions via callbacks to a listener interface.

20. The non-transitory computer-readable storage medium of claim 15, wherein the signaling software component includes a backend process that contains the signaling protocol stack down to a transport level, a frontend process that employs stream control transmission protocol (SCTP) using Ethernet network interface cards in a host, and a log daemon process that logs on behalf of the backend process and the frontend process.

* * * * *

UNITED STATES PATENT AND TRADEMARK OFFICE
CERTIFICATE OF CORRECTION

PATENT NO. : 8,498,302 B2  
APPLICATION NO. : 12/493735  
DATED : July 30, 2013  
INVENTOR(S) : Wilde et al.

Page 1 of 2

It is certified that error appears in the above-identified patent and that said Letters Patent is hereby corrected as shown below:

In the Drawings

On sheet 4 of 5, in figure 4, under Reference Numeral 400, line 1, delete "reques t" and insert -- request --, therefor.

On sheet 4 of 5, in figure 4, under Reference Numeral 402, line 1, delete "int o" and insert -- into --, therefor.

On sheet 4 of 5, in figure 4, under Reference Numeral 402, line 3, delete "telecomm unications" and insert -- telecommunications --, therefor.

On sheet 4 of 5, in figure 4, under Reference Numeral 404, line 1, delete "ga teway" and insert -- gateway --, therefor.

On sheet 4 of 5, in figure 4, under Reference Numeral 404, line 2, delete "thir d" and insert -- third --, therefor.

On sheet 4 of 5, in figure 4, under Reference Numeral 404, line 3, delete "app lication." and insert -- application. --, therefor.

In the Claims

In column 9, line 67, in Claim 8, after "one" insert -- or --.

In column 10, line 18, in Claim 9, delete "claim 6" and insert -- claim 8 --, therefor.

In column 10, line 21, in Claim 10, delete "claim 6" and insert -- claim 8 --, therefor.

Signed and Sealed this  
Twelfth Day of November, 2013

Teresa Stanek Rea  
*Deputy Director of the United States Patent and Trademark Office*

In column 10, line 25, In Claim 11, delete "claim 6" and insert -- claim 8 --, therefor.

In column 10, line 29, in Claim 12, delete "claim 6" and insert -- claim 8 --, therefor.

In column 10, line 55, in Claim 15, after "one" insert -- or --.